United States Patent [19]

Sauber

[11] Patent Number: 4,918,295

[45] Date of Patent: Apr. 17, 1990

[54] COMBINATION HUBODOMETER PROTECTIVE HOUSING AND STEP

[76] Inventor: Charles J. Sauber, 10 N. Sauber Rd., Virgil, Ill. 60182

[21] Appl. No.: 337,135

[22] Filed: Apr. 12, 1989

[51] Int. Cl.⁴ .............................................. G01C 22/00
[52] U.S. Cl. ..................................... 235/95 B; 235/96
[58] Field of Search ..................... 235/10, 95 R, 95 C, 235/96, 97

[56] References Cited

U.S. PATENT DOCUMENTS

| | | | |
|---|---|---|---|
| 3,198,430 | 8/1965 | Hermann | 235/95 B |
| 4,156,131 | 5/1979 | Haynes et al. | 235/95 C |
| 4,430,561 | 2/1984 | Powell | 235/95 B |
| 4,563,574 | 1/1986 | Dreyer et al. | 235/95 B |
| 4,697,278 | 9/1987 | Fleischer | 235/95 B X |

*Primary Examiner*—B. R. Fuller
*Attorney, Agent, or Firm*—Leydig, Voit & Mayer

[57] ABSTRACT

A combination hubodometer protective housing and step assembly having a cylindrical metal housing, to which the hubodometer is mounted, and a cylindrical metal adapter, which couples the housing and hubodometer to the axle of a wheel for rotation therewith. The housing and the adapter, and hub assembly and the adapter are coupled by means of threads along the inner and outer surfaces. The hubodometer is mounted to an internal wall of the housing by a threaded stud and nut. The internal wall of the adapter defines an internal chamber which contains lubricant for the vehicle axle. Excess lubricant is allowed to exit the lubricant chamber through vent holes in the housing and step assembly.

6 Claims, 1 Drawing Sheet

COMBINATION HUBODOMETER PROTECTIVE HOUSING AND STEP

FIELD OF THE INVENTION

This invention relates generally to mountings for hubodometers or odometers of the type that are connected to the hub of a vehicle axle or other device for rotation therewith. The invention more particularly concerns adapter devices for mounting hubodometers to the hub of a rotating axle.

BACKGROUND OF THE INVENTION

Hubodometers have been used on vehicles, such as trailers and golf carts, in order to determine the distance traveled by the vehicle. A hubodometer is generally coupled to the wheel hub of an axle in order to measure the number of rotations of the wheel and thus the distance traveled by the vehicle. While a hubodometer may be mounted directly to a hub, typically a molded plastic cap containing oil lubricant is fastened to the axle wheel hub. Consequently, a bracket is often used to couple the hubodometer to the cap of the axle hub area.

This method of attachment does not effectively protect a hubodometer from frequently encountered rugged operating conditions that may result in damage to the device. Impacts due to travel on rough or unpaved roads often damage the hubodometer and mounting bracket. Additionally, operators frequently use the hub of the vehicle axle and the attached hubodometer as a step to facilitate access to a vehicle or its contents. As the hubodometer and associated mounting assembly are generally not designed for use in this capacity, this practice often results in damage to the axle cap, mounting bracket, and hubodometer. Consequently, frequently required hubodometer assembly maintenance may result in excessive replacement cost and vehicle down time.

OBJECTS OF THE INVENTION

It is a primary object of the invention to provide a protective housing that prevents damage to a hubodometer due to impacts or forces asserted on the device. It is a related object to provide a sturdy hubodometer housing which extends out from the vehicle axle to provide a step.

Another object of the invention is to provide a hubodometer housing which may be easily mounted to and dismounted from a vehicle axle so that hubodometer may be removed for maintenance, gear ratio changes, and the like.

A further object of the invention is to provide a housing device which contains a chamber for holding axle lubricant.

Yet another object is to provide a housing for a hubodometer which allows the transparent window of the hubodometer to be easily viewed by an operator.

More specifically, and in accordance with one aspect of the invention, there is provided a combination hubodometer protective housing and step wherein the hubodometer is internally recessed within a cylindrical metal body which extends outward from the axle hub to provide a step, the metal body having external threads which are coupled with internal threads of the axle hub so that the hubodometer rotates with the body and the axle hub.

Other objects and advantages of the invention will become apparent upon reading the following detailed description and upon references to the drawings, in which:

DETAILED DESCRIPTION OF THE PREFERRED EMBODIMENT

Figure 1:
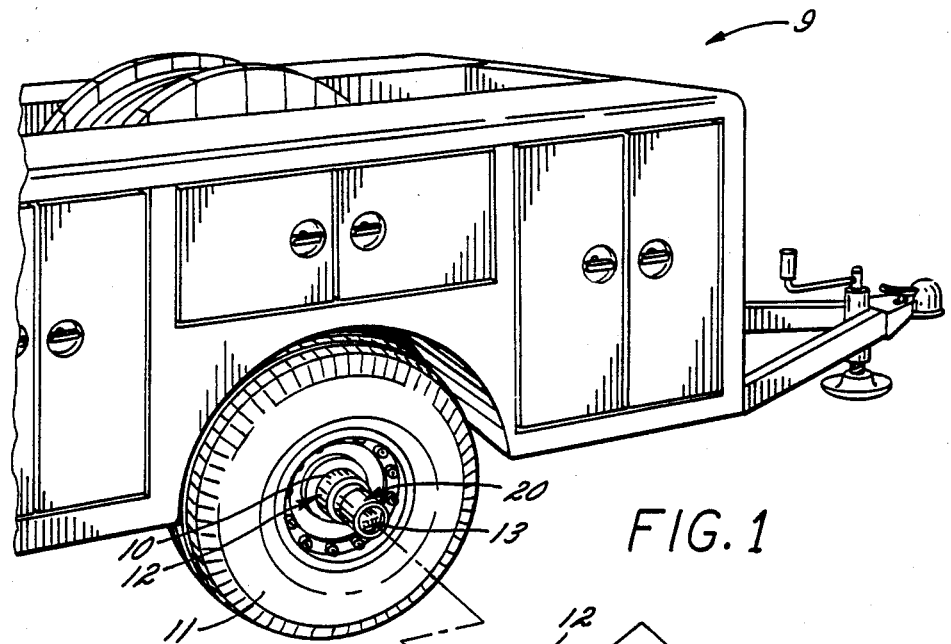
FIG. 1 is a perspective view of a trailer utilizing a hubodometer protective housing and step in accordance with the present invention.

Turning now to the drawings, FIG. 1 shows a utility trailer 9 having an axle 10 upon which a wheel 11 rotates. The wheel hub assembly 12 is located at the center of the wheel 11. While the preferred embodiment of the invention is shown in conjunction with a utility trailer 9, it will be appreciated that the invention may be utilized with any rotating device providing a point of attachment.

In accordance with the present invention, a hubodometer is mounted to the wheel hub assembly by way of a combination protective housing and step assembly. The housing and step assembly includes a cylindrical metal body portion, which has external threads on one end which couple with external threads on the axle hub. The other end of the body portion is open to receive the hubodometer therein. The hubodometer mounts to a circular wall located within the cylindrical body portion of the housing and step assembly. Although the mounted hubodometer is recessed within the body portion, the transparent face of the hubodometer is visible through the forward opening of the body. As the hubodometer housing and step assembly projects outwardly from the vehicle axle and wheel hub assembly, it provides both a protective housing to prevent damage to the hubodometer and a rigid step to facilitate access to the trailer or other vehicle.

Figure 2:
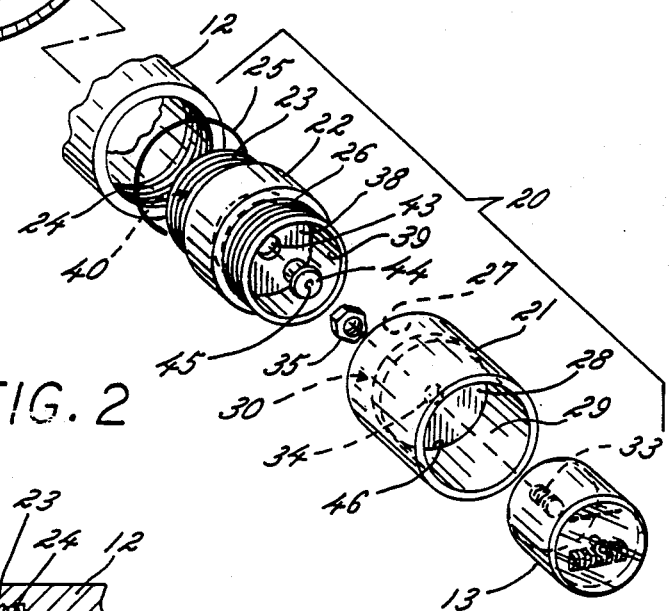
FIG. 2 is an exploded fragmentary perspective showing the wheel hub assembly, a hubodometer, and the combination housing and step shown in FIG. 1.

Returning to FIG. 1, the hubodometer 13 is mounted to the wheel hub assembly 12 by way of the hubodometer protective housing and step assembly 20. The hubodometer may be, for example, the type shown in U.S. Pat. No. 3,198,430. The sturdy assembly 20 extends out from the wheel 11 of the trailer 9 so that an operator may use the assembly 20 as a step to facilitate access to the trailer 9. As shown in the exploded view in FIG. 2 and the cross sectional view in FIG. 3, the protective housing and step assembly 20 comprises a cylindrical housing 21 and a cylindrical adapter 22. So that the hubodometer 13 may rotate with the wheel 11, the hubodometer 13 is mounted to the housing 21, and further coupled to the adapter 22 and wheel hub assembly 12.

Figure 3:
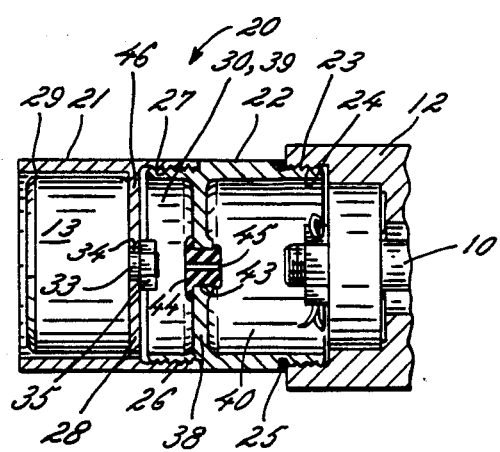
FIG. 3 is a cross section of the hubodometer, housing and wheel hub assembly shown in FIG. 1.

In order to secure the housing and step assembly 20 to the wheel hub assembly 12, one end of the adapter 22 is provided with external threads 23 which couple with internal threads 24 of the hub assembly 12. To ensure that the threads 23, 24 are clamped together with sufficient force to secure the adapter 22 to the hub assembly 12, an o-ring 25 as situated along the outer surface of the adapter 22, as shown in FIG. 3. In a similar manner, the opposite end of the adapter 22 is provided with external threads 26 which couple with internal threads 27 of the housing 21 to secure the housing 21 to the adapter 22.

One skilled in the art will appreciate that the aforementioned method of attachment is given by way of example, and not limitation. Thus, the housing 21 may be coupled to the adapter 22, and the adapter 22 secured to the hub assembly 12 by any suitable means.

In order to provide a means by which the hubodometer 13 may be attached to the assembly 20, the housing 21 is provided with an internal wall 28 which defines an outer chamber 29 and an inner chamber 30 within the housing 21. A standard hubodometer 13 may be mounted within the outer chamber 29 by any suitable means. The embodiment shown in FIGS. 2 and 3 utilizes a hubodometer 13 of the type having a threaded stud 33 extending from the back wall of the hubodometer 13. In order to secure the hubodometer 13 to the housing 21, the internal wall 28 is provided with an opening 34 which receives the threaded stud 33. The hubodometer 13 is secured against movement in the outer chamber 29 by a nut 35 which tightens onto the threaded stud 33 extending through the opening 34 in the internal wall 28 of the housing 21. In this way, the hubodometer 13 is mounted to the housing 21, which is further coupled to the adapter 22 and the wheel hub assembly 12 so that the hubodometer 13 rotates with the wheel 11. One skilled in the art will appreciate that the housing 21 may easily be removed from the adapter 22 mounted on the hub assembly 12 in order to facilitate hubodometer 13 maintenance or gear ratio changes.

The combination protective housing and step further provides a means by which oil lubricant may be maintained at the trailer axle. To this end, the adapter 22 is provided with an internal wall 38 which defines an outer chamber 39 and an inner chamber 40 the adapter 22. It will be appreciated that when the housing 21 is secured to the adapter 22, the adapter outer chamber 39 and the housing inner chamber 30 form an intermediate chamber 30, 39 as shown in FIG. 3. When the adapter 22 is mounted to the hub assembly 12, the oil or other lubricant contained in the inner chamber 40 will maintain lubrication of the axle 10. In order to allow excess lubricant to exit the inner chamber 40, the adapter internal wall 38 is provided with a vent hole 43 and an associated plug 44. The flow of lubricant is thus controlled by the orifice 45 of the vent plug 44 situated within the vent hole 43. In this way, the lubricant passes from the inner chamber 40 through the orifice 45 to the intermediate chamber 30, 39. In order to further allow the lubricant to pass from the intermediate chamber 30, 39, the housing internal wall 28 is provided with a second vent hole 46 so that the excess lubricant may be expelled around the hubodometer 13 situated in the housing outer chamber 29.

In an alternate embodiment of the invention, the housing and step assembly 20 may be formed as a single unit. In this way the assembly would be formed with a single internal wall to define an inner and an outer chamber. Axle lubricant would be contained within the inner chamber, with excess lubricant passing through a vent hole in the internal wall to be expelled from the assembly. The hubodometer would be mounted within the outer chamber for rotation with the housing and step assembly 20 mounted to the hub assembly 12. Consequently, there would be no intermediate chamber 30, 39 as shown in the embodiment illustrated in FIGS. 2 and 3.

In summary, the combination hubodometer protective housing and step assembly 20 comprises an adapter 22 and an housing 21 to which the hubodometer 13 is secured. The housing 21 is coupled to the adapter 22 by way of threads 27 and 26. The adapter 22 is further mounted to the internal threads 24 of the hub assembly 12 by external threads 23. An internal wall 38 within the adapter 22 defines an internal cavity 40, which contains axle lubricant. Excess lubricant may escape this cavity 40 through the orifice 45 in the vent hole 43 plug 44, and further through the vent hole 46 in the internal wall 28 of the housing 46. The adapter 22 and housing 21 of the assembly 20 are made of a rigid material, such as an aluminum alloy, so that the assembly 20 protects the encased hubodometer 13 from damage as well as provides a step which extends outward from the vehicle 9.

I claim:

1. For use in connection with a vehicle axle having an internally threaded cylindrical hub end, a combination hubodometer protective housing and step comprising, a cylindrical metal body having an open outward end for receiving the hubodometer internally and entirely recessed therein so that the cylindrical metal body protects the hubodometer against external impacts and forces, said body having an inward end with external threads for coupling with said axle hub threaded end to project outwardly therefrom as a step, and a circular wall located internally within the body, said wall defining an inner chamber for containing lubricant for said axle and an outer chamber for receiving the hubodometer, said wall having mounting means for connecting the hubodometer thereto for rotation with the body and axle hub.

2. A hubodometer housing and step as claimed in claim 1 wherein the body is a cast aluminum alloy.

3. For use in connection with a vehicle axle having an internally threaded cylindrical hub end, a combination hubodometer protective housing and step comprising, a cylindrical metal body comprising inner and outer parts threadably connected together, said body having an open outward end for receiving the hubodometer internally recessed therein, said body having an inward end with external threads for coupling with said axle hub threaded end to project outwardly therefrom as a step, and a circular wall located internally within the body having mounting means for connecting the hubodometer thereto for rotation with the body and axle hub, said circular wall defining an outer chamber for receiving the hubodometer and an inner chamber for containing lubricant for said axle.

4. A hubodometer housing and step as claimed in claim 3 wherein said circular wall is adjacent the end of the outer part of said body which is threadably connected to the inner part of said body.

5. A hubodometer housing and step as claimed in claim 3 wherein said outer part contains said circular wall and said inner part includes a second circular wall so that there is an intermediate chamber between the connected parts.

6. A hubodometer housing and step as claimed in claim 5 wherein said second circular wall has a resilient fitting member within an opening in the wall for providing a vent and lubrication passage to the axle hub.

* * * * *